US009050722B2

(12) United States Patent
Satou

(10) Patent No.: US 9,050,722 B2
(45) Date of Patent: Jun. 9, 2015

(54) PICKUP DEVICE CAPABLE OF DETERMINING HOLDING POSITION AND POSTURE OF ROBOT BASED ON SELECTION CONDITION

(71) Applicant: FANUC CORPORATION, Yamanashi (JP)

(72) Inventor: Taiga Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 14/025,427

(22) Filed: Sep. 12, 2013

(65) Prior Publication Data

US 2014/0074288 A1    Mar. 13, 2014

(30) Foreign Application Priority Data

Sep. 13, 2012  (JP) ................................. 2012-201958

(51) Int. Cl.
    *G05B 19/18*       (2006.01)
    *B25J 9/16*        (2006.01)
    *G05B 19/408*      (2006.01)
    *G05B 19/04*       (2006.01)

(52) U.S. Cl.
    CPC .............. *B25J 9/1612* (2013.01); *B25J 9/1679* (2013.01); *G05B 19/4083* (2013.01); *G05B 2219/37555* (2013.01); *G05B 2219/39476* (2013.01); *G05B 2219/40053* (2013.01)

(58) Field of Classification Search
    CPC .. B62D 57/032; G05S 1/0274; G05D 1/0246; G05D 1/0255; G05D 1/0242
    See application file for complete search history.

(56) References Cited

U.S. PATENT DOCUMENTS

| 2002/0169522 | A1  |  11/2002 | Kanno |
| 2007/0282485 | A1* | 12/2007 | Nagatsuka et al. ........... 700/245 |
| 2009/0285664 | A1* | 11/2009 | Kim et al. ..................... 414/730 |
| 2010/0103106 | A1* |  4/2010 | Chui ............................. 345/166 |
| 2010/0298974 | A1* | 11/2010 | Okahisa et al. ............... 700/230 |
| 2011/0280472 | A1* | 11/2011 | Wallack et al. ............... 382/153 |
| 2012/0022827 | A1* |  1/2012 | Hertgens et al. .............. 702/150 |
| 2012/0053724 | A1* |  3/2012 | Okamoto et al. ............. 700/114 |
| 2012/0059517 | A1  |  3/2012 | Nomura |
| 2012/0216384 | A1* |  8/2012 | Immekus ........................ 29/428 |

FOREIGN PATENT DOCUMENTS

| JP | 2002-331480 A | 11/2002 |
| JP | 2012-055999 A |  3/2012 |

* cited by examiner

*Primary Examiner* — Ian Jen
(74) *Attorney, Agent, or Firm* — Lowe Hauptman & Ham, LLP

(57) ABSTRACT

A pickup device includes a robot for holding a target object, a sensor for measuring a position/posture of an object, a first storing unit for storing a reference holding position/posture, a second storing unit for storing a holding position/posture modification range, a calculating unit for calculating a holding position/posture of the robot based on the position/posture of the target object and the reference holding position/posture, a third storing unit for storing a selection condition determining priority of the holding position/posture, and a selecting unit for selecting a holding position/posture of the robot, based on the priority determined by the selection condition, among the holding positions/postures of the robot obtained from the holding position/posture of the robot and the holding position/posture modification range.

8 Claims, 9 Drawing Sheets

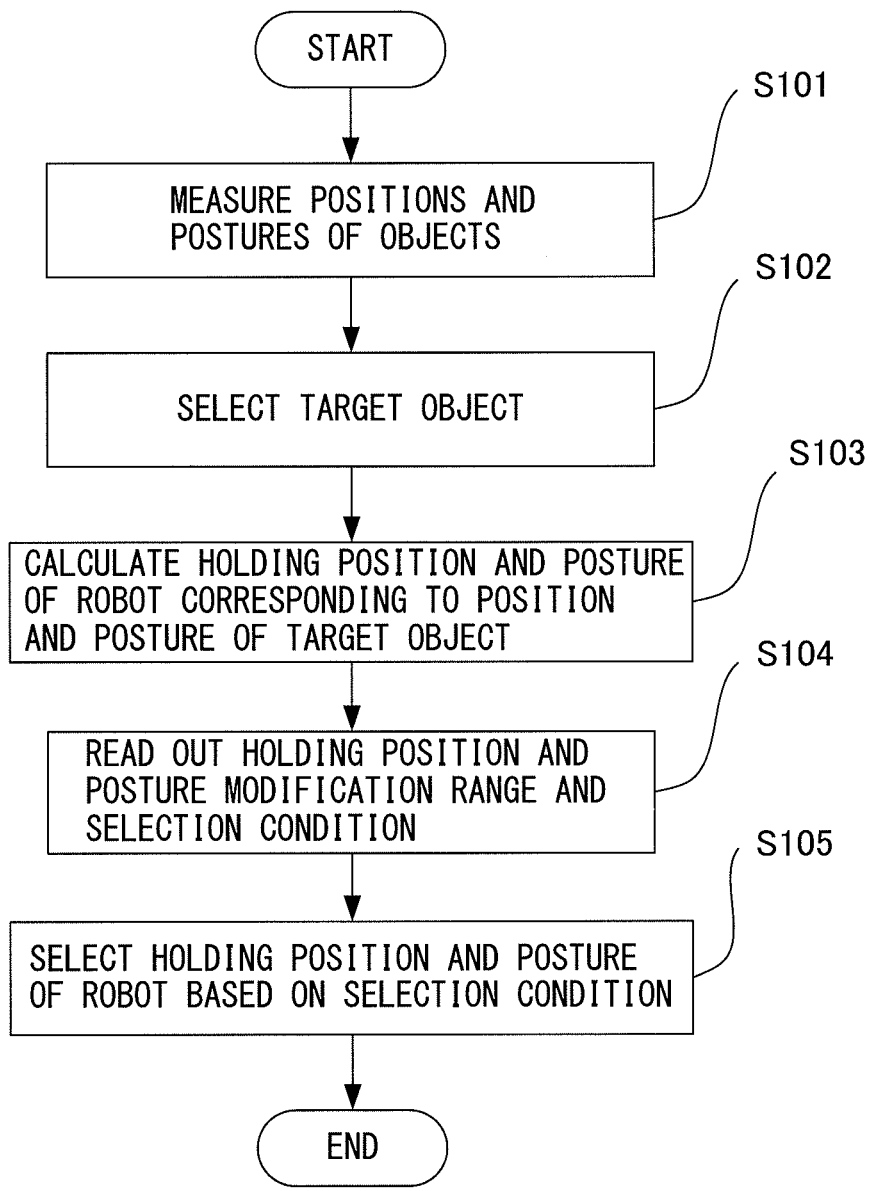

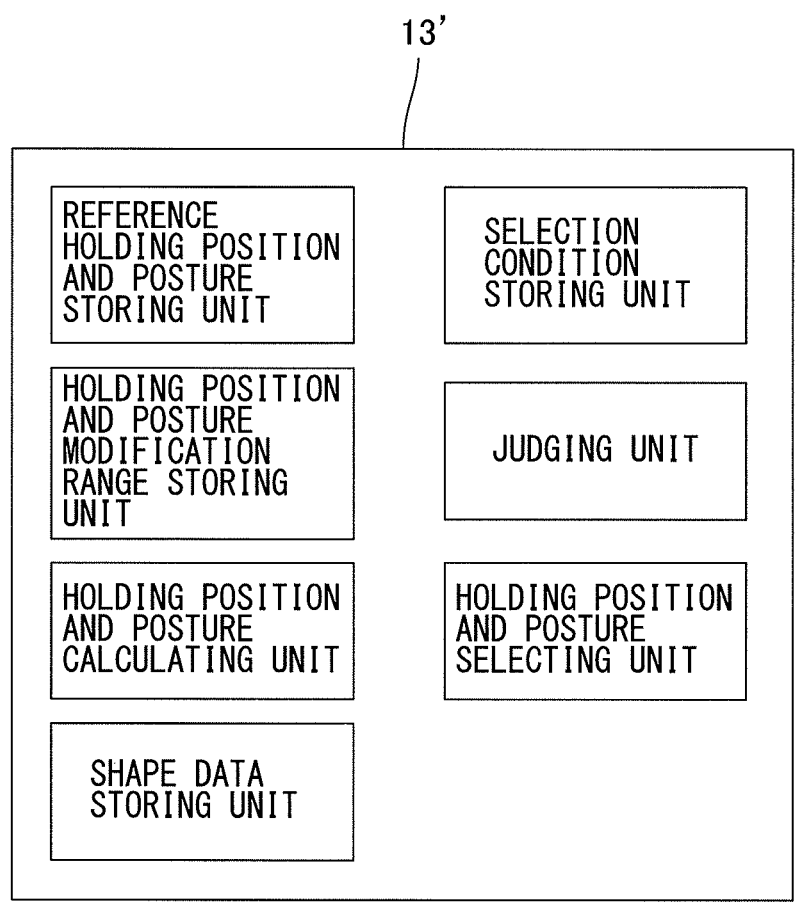

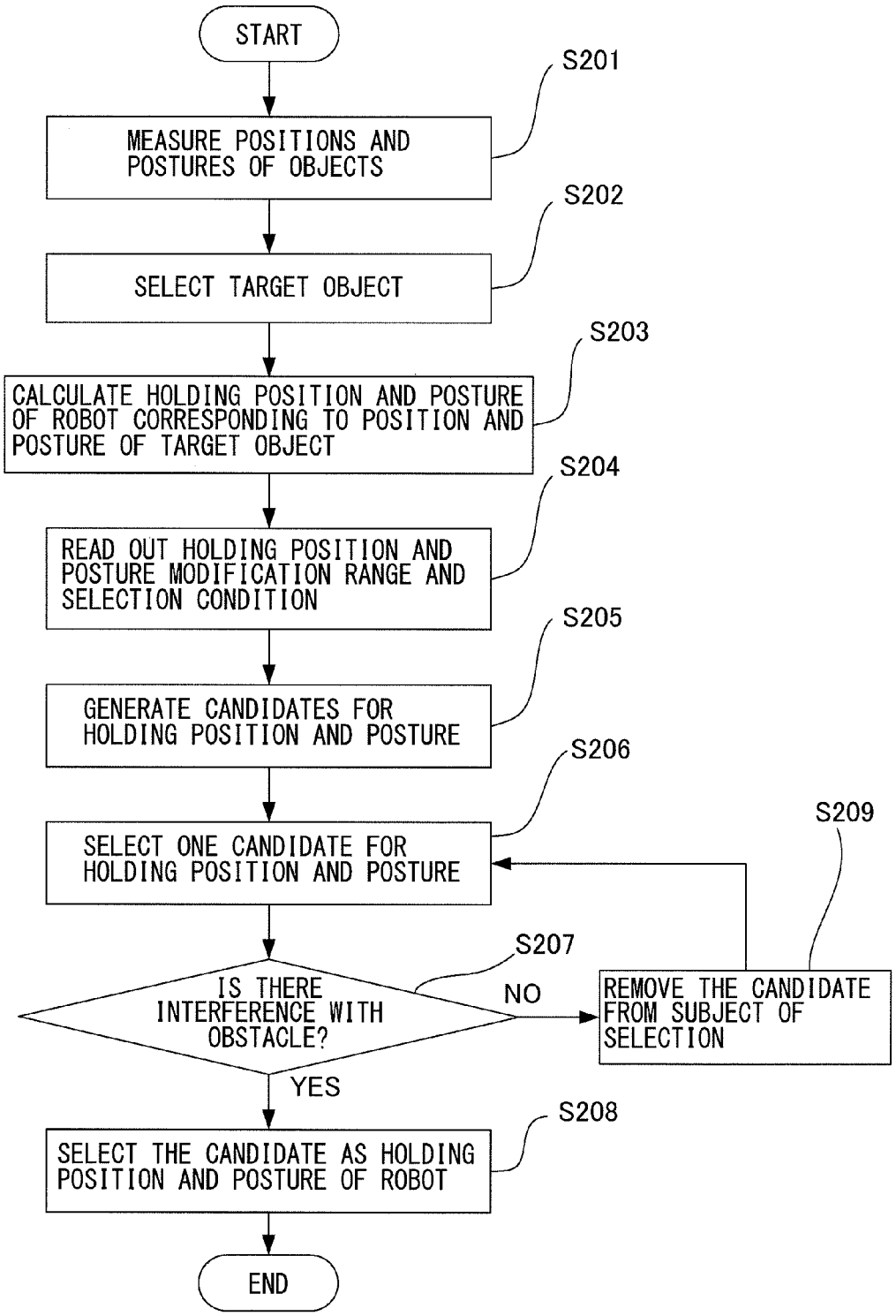

PICKUP DEVICE CAPABLE OF DETERMINING HOLDING POSITION AND POSTURE OF ROBOT BASED ON SELECTION CONDITION

RELATED APPLICATIONS

The present application is based on, and claims priority from, Japanese Application Number 2012-201958, filed Sep. 13, 2012, the disclosure of which is hereby incorporated by reference herein in its entirety.

BACKGROUND OF THE INVENTION

1. Field of the Invention

The present invention relates to a pickup device for picking up a target object by controlling a robot based on a result of measurement of positions and postures of objects by using a sensor.

2. Description of the Related Art

A known pickup device for picking up an object by a robot is designed to have a predetermined reference position and posture relative to an object to be held, in which the robot is able to hold the object. Based on a position and posture of the object measured by a sensor and on the reference position and posture, a position and posture of the robot are calculated in order to hold the object. In such a pickup device, an object in any position and posture can be picked up by the robot.

JP-B-3782679 discloses a related art that involves, in order to calculate a position and posture of a robot for picking up an object, predetermining a range of positions and postures of the robot relative to an object, in which the robot is able to grasp the object, and calculating a position and posture of the robot in which a tool of the robot does not interfere with a storage box for accommodating objects, so as to ensure that there is no interference between the storage box and the tool.

JP-A-2012-055999 discloses a related art that involves measuring positions and postures of a plurality of objects by a sensor, calculating priority as indicator to reduce cycle time for picking up the respective objects or priority as an indicator to stably convey the objects, and determining a target object to be picked up according to the priority, in order to reduce cycle time of a pickup process or to provide stable conveyance of the objects.

In the conventional pickup devices, depending on a position and posture of the object, there arise the following problems:

(1) that a position and posture of a robot for holding a measured object may be deviated from a range of movement of the robot;

(2) that it may require much longer time to move the robot to a position and posture for picking up the object; and/or (3) that a tool attached to a tip of the robot or to an arm of the robot, or a robot body may have a posture which tends to cause interference with an obstacle in the periphery of the robot.

JP-B-3782679 discloses a related art in which candidates for a position and posture of the robot which fall within a range of positions and postures of the robot set by an operator are calculated in a predetermined order, and the candidates are sequentially subject to judgment as to whether or not they cause interference. When it is judged that there is no interference, the position and posture of the robot are then confirmed. Thus, even if there is potentially another position and posture within the predetermined range, which are more desirable in terms of reducing time for movement of the robot or the like, such a position and posture are not always selected. Therefore, there is still room for improvement when it comes to reducing cycle time of the pickup process.

JP-A-2012-055999 discloses a related art in which priority indicative of which object should be picked up is calculated for the individual objects, and an object is selected according to the priority. However, if objects are picked up successively from a pile of objects, as the pickup process proceeds, more and more objects with lower priority are left behind. If this is the case, an expected effect such as reduction of cycle time and stabilization of a conveyance process can be no longer achieved. Accordingly, there is a problem that the related art disclosed in JP-A-2012-055999 cannot constantly produce an expected result.

SUMMARY OF THE INVENTION

According to the present disclosure, a pickup device for picking up a target object from a plurality of objects, comprising: a robot equipped with a tool adapted to hold the target object; a sensor for measuring positions and postures of the plurality of objects; a reference holding position and posture storing unit for storing a reference holding position and posture which serve as a reference for a position and posture of the robot relative to the target object when the robot holds the target object by the tool; a holding position and posture modification range storing unit for storing a holding position and posture modification range which corresponds to a range of modification which can be applied to the reference holding position and posture so as to hold the target object by the tool; a holding position and posture calculating unit for calculating a holding position and posture of the robot in which the robot can hold the target object by the tool, based on the position and posture of the target object measured by the sensor and on the reference holding position and posture; a selection condition storing unit for storing at least one selection condition, based on which priority of the holding position and posture of the robot can be determined; and a holding position and posture selecting unit for selecting one of the holding positions and postures of the robot in accordance with the priority determined by the selection condition, the holding positions and postures of the robot being obtained from the holding position and posture calculated by the holding position and posture calculating unit and from the holding position and posture modification range, is provided.

According to the present disclosure, a pickup device for picking up a target object from a plurality of objects, comprising: a robot equipped with a tool adapted to hold the target object; a sensor for measuring positions and postures of the plurality of objects; a reference holding position and posture storing unit for storing a reference holding position and posture which serve as a reference for a position and posture of the robot relative to the target object when the robot holds the target object by the tool; a holding position and posture modification range storing unit for storing a holding position and posture modification range which corresponds to a range of modification which can be applied to the reference holding position and posture so as to hold the target object by the tool; a holding position and posture calculating unit for calculating a holding position and posture of the robot in which the robot can hold the target object by the tool, based on the position and posture of the target object measured by the sensor and on the reference holding position and posture; a selection condition storing unit for storing at least one selection condition, based on which priority of the holding position and posture of the robot can be determined; a shape data storing unit for storing a shape data of the tool and a shape data of an obstacle which exists in the periphery of the robot; a judging unit for judging as to whether there is interference between the tool and the obstacle, based on the position and posture of the robot, on the shape data of the tool and on the shape data of the obstacle; and a holding position and posture selecting unit for selecting one of the holding positions and postures of the robot in accordance with the priority determined by the selection condition, the holding positions and postures of the robot being judged by the judging unit that there is no interference, the holding positions and postures of the robot being obtained from the holding position and posture calculated by the holding position and posture calculating unit and from the holding position and posture modification range, is also provided.

These and other objects, features and advantages of the present invention will become more apparent in light of the detailed description of exemplary embodiments thereof as illustrated by the drawings.

BRIEF DESCRIPTION OF THE DRAWINGS

FIG. 7 shows a flow chart of an exemplary process performed by the pickup device according to the first embodiment;

FIG. 8A is a schematic view illustrating a configuration of a robot controller of a pickup device according to a second embodiment of the present invention;

FIG. 8B shows a flow chart of an exemplary process performed by the pickup device according to the second embodiment;

DETAILED DESCRIPTION OF THE INVENTION

Figure 1:
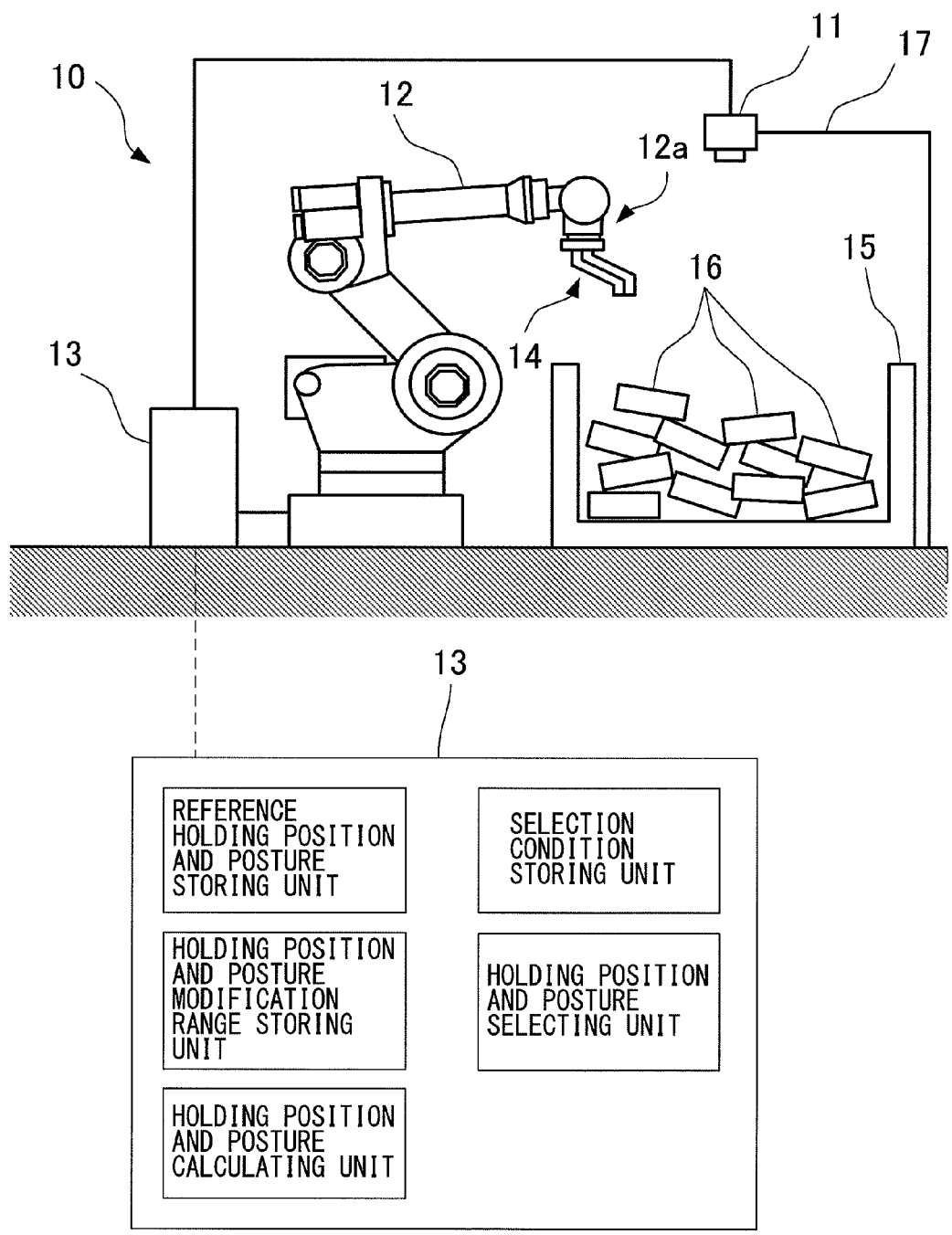
FIG. 1 is a schematic view illustrating an overall configuration of a pickup device according to a first embodiment of the present invention.

FIG. 1 is a schematic view illustrating a configuration of a pickup device 10 for picking up an object according to a first embodiment of the present invention. The pickup device 10 includes a camera 11, a robot 12, and a robot controller 13 connected to the robot 12 so as to control the robot 12. The robot 12 has a hand 14 attached to a tip 12a of the robot 12. Although not illustrated, the robot controller 13 has a hardware configuration including a processor, a ROM, a RAM, a non-volatile RAM, an input means operated by an operator, a display device for displaying various information, an I/O interface, and a controller for controlling a servo motor provided at each joint of the robot 12. The robot controller 13 also has a configuration including a reference holding position and posture storing unit, a holding position and posture modification range storing unit, a holding position and posture calculating unit, a selection condition storing unit, and a holding position and posture selecting unit.

A plurality of objects 16 are piled up within a container 15 which opens in its upper portion. The pickup device 10 is designed to measure positions and postures of objects 16 by taking an image thereof by using the camera 11, and to calculate, by the robot controller 13, a position and posture of the robot 12 corresponding to the position and posture of a target object 16a which should be picked up. The pickup device 10 is also designed to move the robot 12 to the calculated position and posture, and to pick up the target object 16a with the hand 14 holding the target object 16a.

Although the camera 11 is used as a sensor for measuring positions and postures of objects 16 in a three dimensional space according to the first embodiment, any other types of sensor capable of measuring positions and postures of the objects 16 may also be available. When the camera 11 is used, a position and posture of an object 16 can be measured by detecting four points on the object 16 on the same plane, whose relative relationship between one another is predetermined, from an image region taken by the camera 11. As opposed to the illustrated embodiment in which the camera 11 is fixed to a support stand 17, the camera 11 may also be attached to the tip 12a of the robot 12.

Figure 2:
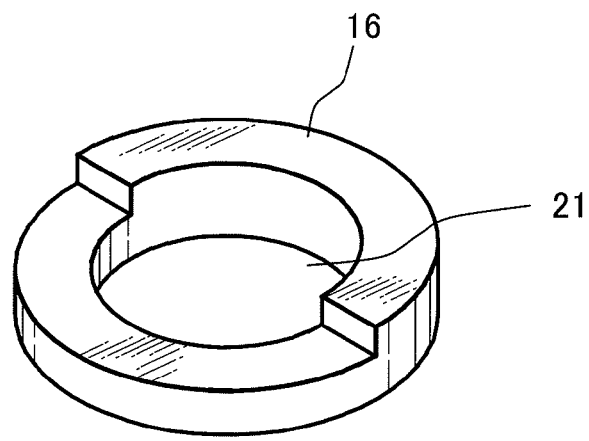
FIG. 2 is a perspective view illustrating a shape of an object picked up by the pickup device according to the first embodiment.
Figure 3:
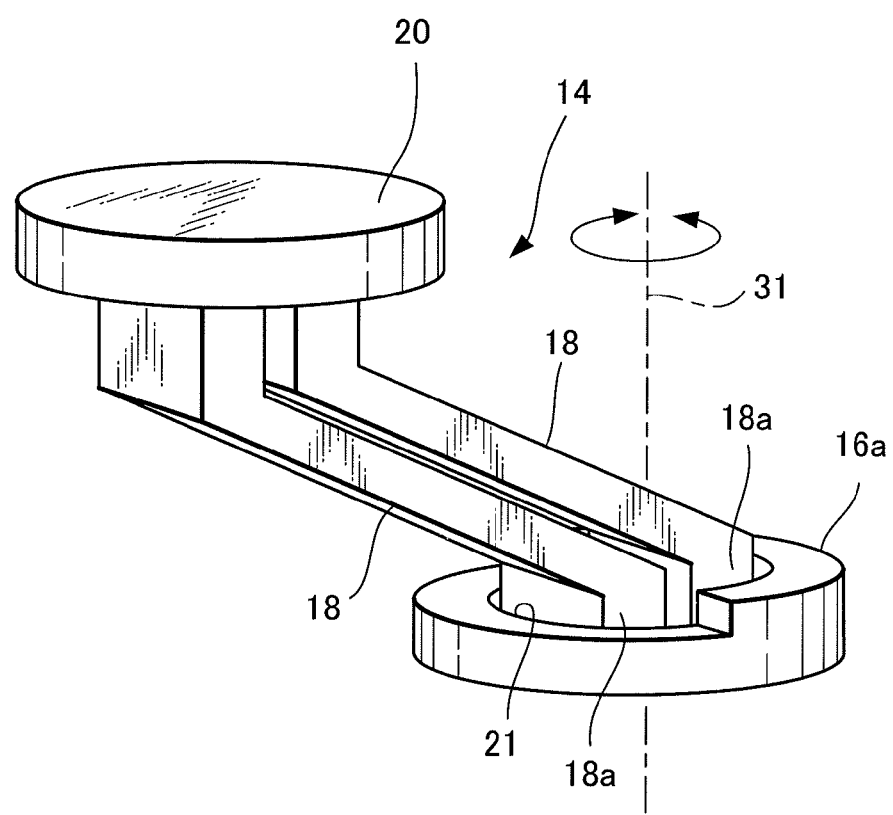
FIG. 3 is a perspective view illustrating a positional relationship between a target object and a hand when a robot is in a holding position and posture in the pickup device according to the first embodiment.

FIGS. 2 and 3 show the hand 14 and the object 16 according to the first embodiment. The object 16 has a substantially cylindrical shape, part of which is cut out, with a circular hole 21 at its center. The hand 14 is a tool provided at the tip 12a of the robot 12. The hand 14 includes a flange 20 attached to the tip 12a, and two claws 18 extending parallel to each other from the flange 20. The claws 18 are configured to have a gap therebetween which can be adjusted by a chuck. The hand 14 is intended to hold an object 16 by inserting tip portions 18a of the claws 18 to the hole 21 of the object 16, and then widening the gap between the claws 18, so as to provide pressing force outwardly from the inside the object 16. The object 16 is illustrated only by way of example, any other types of object may also be available, as long as it has a certain shape so as to be held by various tools attached to the tip 12a of the robot 12. The hand 14 may also have other configurations capable of holding the object 16, not limited to the chuck as illustrated, but including any known holding means such as a suction nozzle, an attractive magnet or an adhesive pad. A position and posture of the hand 14 may vary, but depend on a position and posture of the robot 12 controlled by the robot controller 13.

A position and posture of the robot 12 at the time of holding a target object 16a which should be picked up from the container 15 by using the hand 14 (hereinafter referred to as a "holding position and posture") can be calculated as follows. In a preparation stage, an object 16 is placed in a position and posture, which serve as a reference. The position and posture of the object 16 are measured by the camera 11, and the measured position and posture are stored as a reference object position and posture Wn. The robot 12 is then moved to a position and posture where the robot 12 can hold the object 16, and the position and posture of the robot 12 are stored as a reference holding position and posture Rn, which serve as a reference of the holding position and posture of the robot 12. The reference object position and posture Wn and the reference holding position and posture Rn are stored in the robot controller 13. Accordingly, the robot controller 13 includes a reference object position and posture storing unit designed to store the reference object position and posture Wn, and a reference holding position and posture storing unit designed to store the reference holding position and posture Rn.

In an operation stage, a position and posture Wa of the object 16 are measured by the camera 11, and then, a position and posture Ra of the robot 12 relative to the object 16 are calculated by the following formula:

$$Ra = Wa \times inv(Wn) \times Rn,$$

where inv (Wn) represents an inverse matrix of Wn.

In this way, the holding position and posture of the robot relative to the object 16 in any position and posture can be calculated. Calculation of the holding position and posture can be performed by the robot controller 13. Thus, the robot controller 13 includes a holding position and posture calculating unit.

Referring to FIG. 3 again, a holding position and posture modification range will be described. The holding position and posture modification range is a range in which the reference holding position and posture can be modified. Thus, the robot 12 can hold the target object 16a by the hand 14, not only in the reference holding position and posture relative to the target object 16a, but also in any position and posture within the holding position and posture modification range.

In the first embodiment, the target object 16a is held accordingly by teaching the reference holding position and posture of the robot 12 so that the hand 14 is in a position and posture relative to the target object 16a as illustrated in FIG. 3. However, in the case of the illustrated hand 14 and target object 16a with the hole 21 of a circular shape, the target object 16a can be also held even when the hand 14 is rotated around a central axis 31 of the hole 21 of the target object 16a. In order to take advantage of it, according to the first embodiment, the holding position and posture modification range is set so that the hand 14 can rotate around the central axis 31 of the hole 21. Such a holding position and posture modification range is stored in the holding position and posture modification range storing unit of the robot controller 13. The holding position and posture modification range depends on the shape of the object 16 and of the hand 14. Therefore, the holding position and posture modification range is not limited to the illustrated example of rotational movement around a particular axis, but including translational movement or rotational movement around a plurality of axes different from each other, or a combination thereof.

Figure 4:
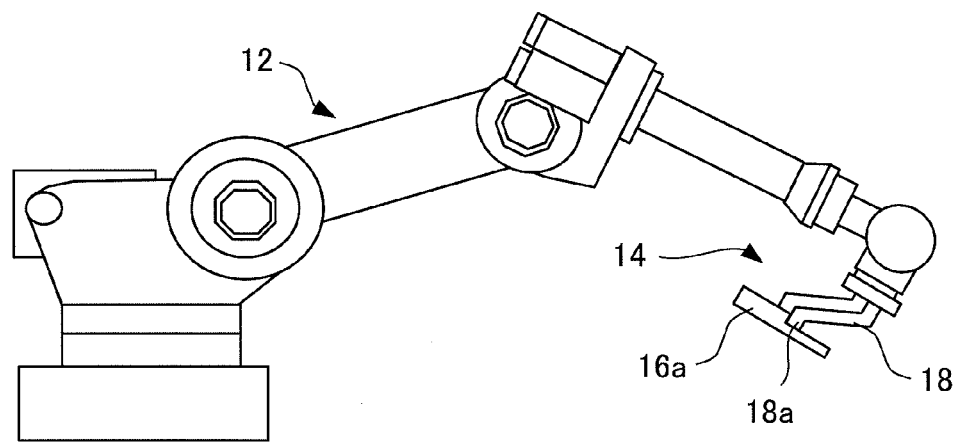
FIG. 4 shows an example in which time required to move the robot to a holding position and posture increases in the pickup device according to the first embodiment.

FIG. 4 shows an example in which time required to move a robot to a holding position and posture increases in the pickup device 10. For convenience, the position and posture of the robot 12 shown in FIG. 1 are considered to be a waiting position and posture before the robot 12 is positioned in a holding position and posture. On the other hand, FIG. 4 shows the robot 12 after the robot 12 is moved to the holding position and posture. In comparison with FIGS. 1 and 4, in the case where a direction of the hand 14 is significantly changed in the process of the movement of the robot 12 from the waiting position and posture to the holding position and posture, it is necessary to rotate the tip 12a of the robot 12 around an axis of the wrist to a great extent. In addition, since the tip portions 18a of the claws 18 of the hand 14 are offset from the tip 12a of the robot 12, the tip 12a of the robot 12 is located distant from the tip portions 18a of the claws 18. Since the hand 14 cannot be moved fast enough, it is necessary to increase the time to move the robot 12 to the holding position and posture.

Figure 5:
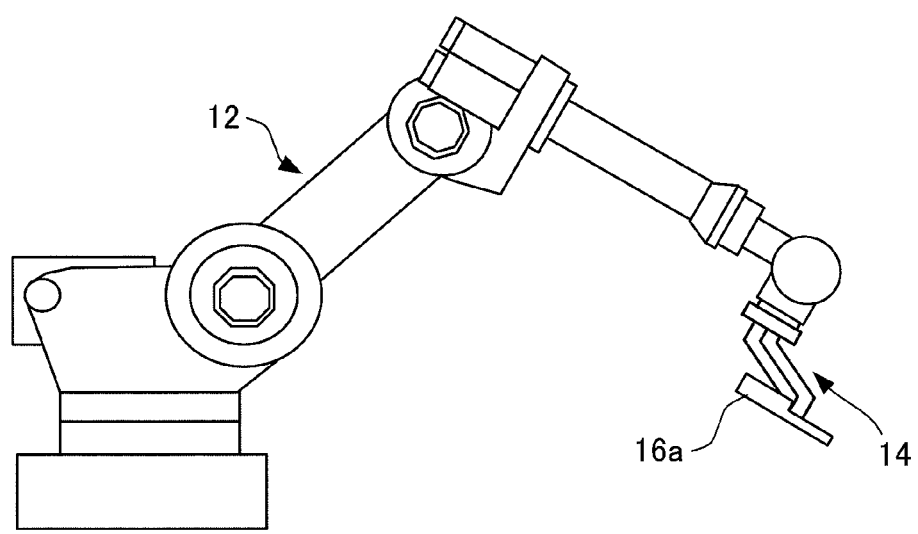
FIG. 5 shows an example in which time required to move the robot to a holding position and posture decreases in the pickup device according to the first embodiment.

In order to reduce the time required to move the robot 12 from a waiting position and posture to a holding position and posture, the holding position and posture of the robot 12 should be changed from a posture shown in FIG. 4 to a posture shown in FIG. 5 by rotating the hand 14 around the central axis 31 of the hole 21 of the target object 16a. FIG. 5 shows the posture of the robot 12 obtained by rotating the robot 12 shown in FIG. 4 around the central axis 31 of the hole 21 of the target object 16a by 180 degrees. In this way, a holding position and posture are selected according to priority in order to ensure that the holding position and posture are approximate to the waiting position and posture. Therefore, time required to move the robot 12 from the waiting position and posture to the holding position and posture can be reduced.

According to the first embodiment, in order to reduce the time required to move the robot 12 to a holding position and posture, the selection condition gives priority to the holding position and posture having a posture approximate to that of the waiting position and posture. In the first embodiment, free rotation around the central axis 31 of the hole 21 of the object 16 is determined as a holding position and posture modification range, and the holding position and posture having a posture approximate to that of the waiting position and posture is preferentially selected in accordance with the selection condition. In this case, the holding position and posture selecting unit of the robot controller 13 is activated to select a holding position and posture of the robot 12 based on the selection condition, as described below. The selection condition is stored by the selection condition storing unit of the robot controller 13, and can be read out by the robot controller 13 as necessary. The selection condition may be a predetermined condition or any condition input by an operator during an operation of the pickup device.

Figure 6A:
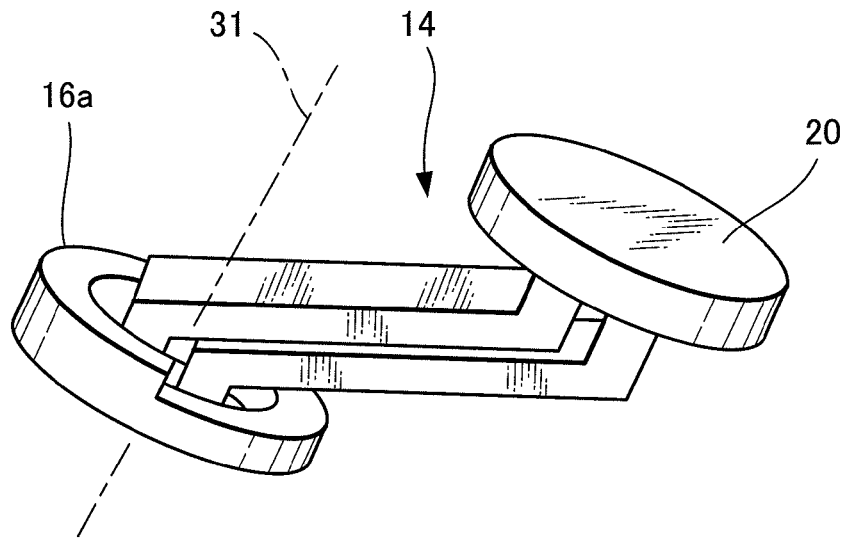
FIG. 6A shows a process for calculating a holding position and posture of the robot based on a selection condition in the pickup device according to the first embodiment.
Figure 6B:
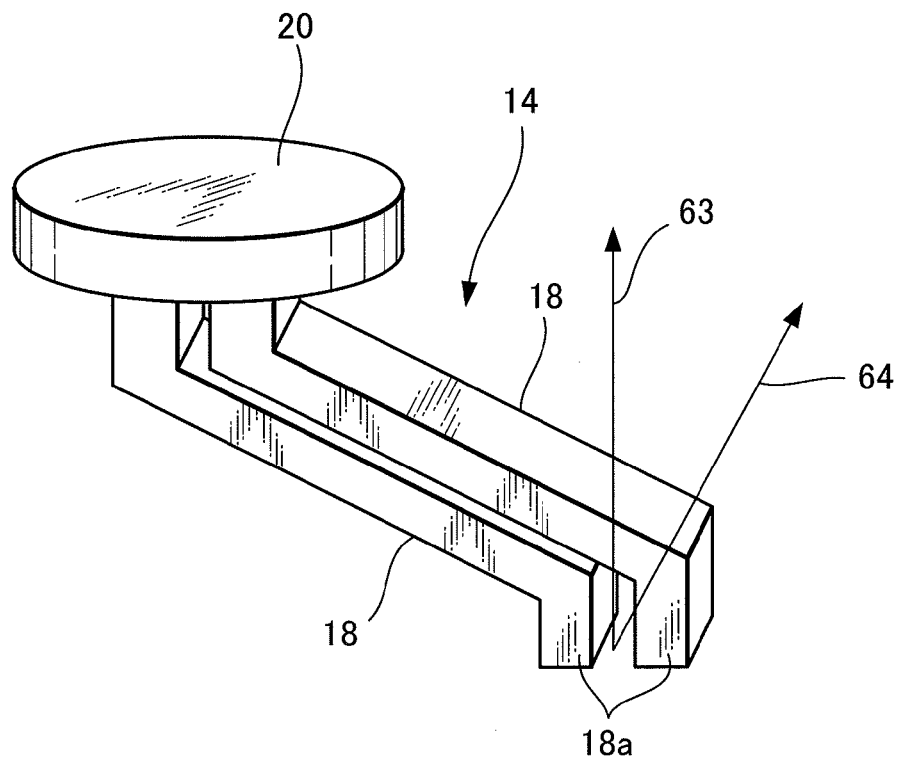
FIG. 6B shows a process for calculating a holding position and posture of the robot based on a selection condition in the pickup device according to the first embodiment.

FIGS. 6A and 6B show a process for calculating a holding position and posture of the robot 12 based on a selection condition in the pickup device 10 according to the first embodiment. FIG. 6A shows the hand 14 in a reference holding position and posture relative to the target object 16a, while FIG. 6B shows the hand 14 in a selection condition posture. In the present embodiment, the selection condition posture has the same posture as that of the waiting position and posture. The difference between these two postures can be quantitatively represented as an amount of rotation around an axis necessary to change one posture to the other. The difference between the selection condition posture and the reference holding position and posture can be minimized, when the robot 12 in the selection condition posture is rotated around a line perpendicular to the central axis 31, so as to have a posture in which a directional vector 63 extending in the direction of the central axis 31 seen from the hand 14 of the robot 12 matches a directional vector 64 extending parallel to the central axis 31 when the robot 12 is in the reference holding position and posture. Therefore, in the first embodiment, such a position and posture are selected as the holding position and posture of the robot 12. This calculating process is a non-limiting, exemplary process for calculating the holding position and posture of the robot 12 performed in accordance with the selection condition. In addition, since the calculation process for calculating the holding position and posture of the robot 12 depends on the selection condition and the holding position and posture modification range, the calculation process must be adjusted in accordance with a given condition.

FIG. 7 shows a flow chart of an exemplary process performed by the pickup device 10 according to the first embodiment. An operation of the pickup device 10 will be described below with reference to the flow chart in FIG. 7 and other relevant drawings.

The process shown in FIG. 7 is initiated with a start command for starting a pickup process of the object 16, for example, in response to an operator activating an operational switch, which is not shown in the drawings. First, positions and postures of a plurality of objects 16 piled up within the container 15 are measured (step S101). At step S101, the positions and postures of the respective objects 16 are determined by taking an image of the objects 16 with a camera 11 attached to the tip 12a of the robot 12 or to the support stand 17, for example, and by processing the image information obtained by the camera 11.

Then, among the objects 16 whose positions and postures are measured by the camera 11 at step S101, a target object 16a which should be picked up is selected (step S102). Preferably, the target object 16a is successively selected according to priority for the selection, which are calculated for the respective objects 16, based on the positions and postures of the objects 16 measured at step S101.

Then, a holding position and posture of the robot 12 corresponding to the position and posture of the target object 16a obtained at step S101 is calculated (step S103). The holding position and posture of the robot 12 can be calculated based on the reference holding position and posture of the robot 12, on the reference object position and posture, and on the position and posture of the object, as described above. The reference holding position and posture as well as the reference object position and posture are obtained at the preparation stage for the pickup device 10, as described above. Therefore, when the process at step S103 is performed, the reference holding position and posture and the reference object position and posture stored by the storing unit of the robot controller 13 are read out therefrom.

The holding position and posture modification range and the selection condition are then read out from the holding position and posture modification range storing unit and the selection condition storing unit, respectively (step S104). The holding position and posture modification range corresponds to rotation around the central axis 31 of the hole 21 of the object 16 in the example of the object 16 and the hand 14 shown in FIGS. 2 and 3, as described above. The selection condition gives priority, for example, to the holding position and posture having a posture approximate to that of the waiting position and posture, as described above in relation to FIGS. 6A and 6B.

Then, based on the holding position and posture calculated at step S103, and on the holding position and posture modification range and the selection condition read out at step S104, a holding position and posture are selected (step S105). The holding position and posture selected at step S105 are sent to the robot controller 13. The robot controller 13 then generates a control command in order to move the robot 12 to the holding position and posture.

A pickup device according to a second embodiment of the present invention will be described. In the following explanation, the same or corresponding constituent elements are designated with the same reference numerals. In the pickup device according to the second embodiment, the robot controller 13' includes, in addition to the configuration according to the first embodiment, a judging unit for judging whether or not there is interference between a tool attached to the tip 12a or the arm of the robot 12, such as the hand 14, and an obstacle which exists in the periphery of an operation area of the robot 12. Unlike the first embodiment, a plurality of candidates for a position and posture within a range in which the robot 12 can hold the object 16 are generated, and among the candidates, only candidates which are judged by the judging unit as causing no interference are selected according to the selection condition. In the following explanation directed to the second embodiment, only matters different from the first embodiment will be described.

In the second embodiment, a shape data of the tool attached to the tip 12a or the arm of the robot 12 and a shape data of the obstacle in the periphery of an operation area of the robot 12, such as the container 15, are stored in a preparation stage, in order for the judging unit of the robot controller 13' to judge as to whether or not there is interference between the tool and the obstacle. These shape data are stored by the shape data storing unit of the robot controller 13' as CAD data, for example. FIG. 8A is a schematic view illustrating a configuration of the robot controller 13' for the pickup device according to the second.

FIG. 8B shows a flow chart of an exemplary process performed by the pickup device according to the second embodiment. An operation of the pickup device 10 will be described below with reference to the flowchart in FIG. 8B and other relevant drawings.

The processes at steps S201 through S204 are the same as steps S101 through S104 in the first embodiment. Specifically, an image of objects 16 is taken by using the camera 11 at step S201, so as to measure positions and postures of the respective objects 16. At step S202, a target object 16a which should be picked up is selected among the objects 16 whose positions and postures are measured. In accordance with a predefined formula, a holding position and posture of the robot 12 is calculated at step S203. Then, a holding position and posture modification range and a selecting condition are read out at step S204, respectively. A plurality of candidates for a holding position and posture of the robot 12 falling within the holding position and posture modification range read out at step S204 are generated (step S205). For example, in the same way as the first embodiment, when the object 16 and the hand 14 shown in FIGS. 2 and 3 are applied, free rotation around the central axis 31 of the hole 21 of the object 16 is set as a modification range in which the robot 12 can hold the object 16. In this case, the candidates for a holding position and posture can be obtained, for example, by rotating the hand 14 around the central axis 31 by every predefined angle in a stepwise manner.

Next, one of the candidates for a holding position and posture having the highest priority specified by the selection condition is selected (step S206). Then, it is judged at step S207 as to whether or not there is interference with an obstacle in the periphery when the robot 12 is in a position and posture corresponding to the candidate for a holding position and posture which has been selected at step S206. In the second embodiment, the selection condition prioritizes a holding position and posture which can be obtained from the waiting position and posture by a smaller amount of changes in posture, in a similar way as the first embodiment. The amount of changes in posture may be quantitatively expressed, for example, by an amount of rotation around a certain axis. For example, a transformation matrix between the respective candidates for a holding position and posture and the waiting position and posture is calculated, and based on the transformation matrix, an amount of rotation for the respective cases can be calculated. Specifically, at step S207, the judgment as to whether or not there is interference is carried out for the candidate for a holding position and posture which requires the minimum amount of rotation. The judgment as to whether or not there is interference is performed based on a position and posture of the robot 12 corresponding to the candidate for a holding position and posture to be judged, on a shape data of the tool attached to the tip 12a or the arm of the robot 12, and on a shape data of the obstacle existent in the periphery of an operation area of the robot 12.

When it is judged at step S207 that there is no interference, the candidate, which is the subject of the judgment, is selected as a holding position and posture of the robot 12 (step S208). The result of selection at step S208 is sent out to the robot controller 13'. The root controller 13' then functions to create a control command in order to move the robot 12 to the holding position and posture which have been selected. On the other hand, when it is judged at step S207 that there will be interference, a position and posture corresponding to the candidate which has been judged are removed from the candidates for a holding position and posture (step S209). Then, the process returns to step S206, and a next candidate for a holding position and posture having the highest priority specified by the selection condition is selected.

Next, a pickup device according to a third embodiment of the present invention will be described. The third embodiment uses a selection condition different from those used in the first and second embodiments. Specifically, in the pickup device according to the third embodiment, priority is given by the selection condition to a position and posture which provide a greater distance between a point fixed at the tip 12a of the robot 12 and a fixed plane independent of the robot 12. In the following explanation directed to the third embodiment, only matters different from the first and second embodiments will be described.

The third embodiment is advantageous in the following case, for example. In the case where an object 16 which cannot be recognized by an image taken by the camera 11 exists near the target object 16a to be picked up, and the former object 16 and the latter target object 16a are situated at heights closer to each other, the tip 12a of the robot 12 might come in contact with the object 16 situated close to the target object 16a, in the process of movement of the robot 12 to a holding position and posture in order to hold the target object 16a. Such an incident tends to occur when a flange 20 of the tip 12a of the robot 12 is in a lower position, for example, as shown in FIG. 4. Therefore, in order to avoid this problem, a selection condition is applied such that priority is given to a holding position and posture of the robot 12 which allow the flange 20 of the tip 12a of the robot 12 to be in a higher position.

Figure 9:
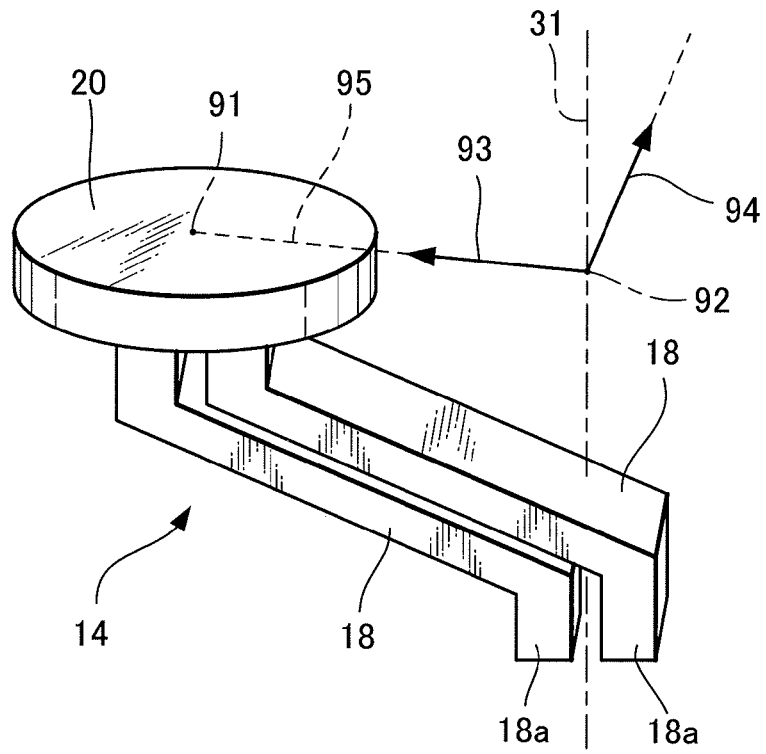
FIG. 9 shows a process for calculating a holding position and posture of a robot based on a selection condition in a pickup device according to a third embodiment of the present invention.

FIG. 9 shows a process for calculating a position and posture of the robot 12 based on a selection condition. In the following example, a designated site 91 on an upper surface of the flange 20 is set as a target which should be in a higher position. In this case, in order to obtain a holding position and posture of the robot 12 for allowing the designated site 91 to be in a highest possible position, a holding position and posture of the robot 12 are selected from the holding position and posture modification range, so that a distance between the designated site 91 fixed at the tip 12a of the robot 12 and a floor surface which is considered to be a fixed plane independent of the robot 12 can be maximized. In the case where a perpendicular line 95 drawn from the designated site 91 to the central axis 31 of the hole 21 of the object 16 has a distal end 92, the designated site 91 is in a highest position when a scalar product of a directional vector 93 extending from the distal end 92 to the designated site 91 along the perpendicular line 95 and a directional vector 94 extending perpendicular to the floor surface has the maximum value. Accordingly, a holding position and posture having the highest priority specified by the selection condition can be identified by determining a holding position and posture of the robot 12 for producing the maximum scalar product of the two directional vectors 93 and 94.

As opposed to the exemplary third embodiment in which priority is given to a position and posture of the robot 12 for providing a greater distance between a point fixed at the tip 12a of the robot 12 and a fixed plane independent of the robot 12, priority may also be specified in different ways, for example, in accordance with a distance between points, a distance between a point and a line, an angle defined between lines.

Next, a pickup device according to a fourth embodiment of the present invention will be described. The pickup device in the fourth embodiment provides the robot 12 with multiple degrees of freedom in movement within the holding position and posture modification range, and therefore, the fourth embodiment differs from the first, second and third embodiments in that a plurality of selection conditions are set. In the following explanation directed to the fourth embodiment, only matters different from the first, second and third embodiments will be described.

Figure 10:
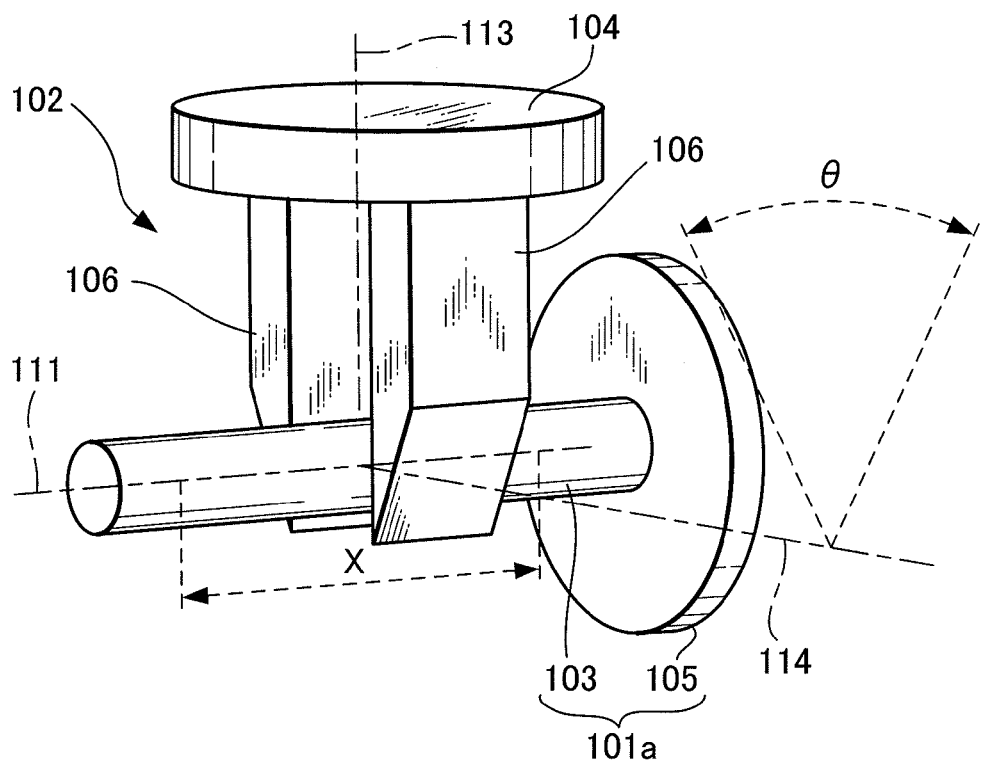
FIG. 10 illustrates a holding position and posture modification range in a pickup device according to a fourth embodiment of the present invention.

In the fourth embodiment, as shown in FIG. 10, the pickup device operates to pick up an object 101 having a cylindrical portion 103 having an elongated cylindrical shape and a flange portion 105. The tip 12a of the robot 12 is provided with a hand 101 for holding the object 101. The hand 102 includes a flange 104 attached to the tip 12a of the robot 12, and two claws 106 extending perpendicularly from the bottom face of the flange 104 and parallel to each other. The hand 102 is designed to hold the object 101 between the two claws 106 by adjusting a distance between the claws 106 by way of a chuck.

When a reference holding position and posture of the robot is set so that the target object 101a and the hand 102 are in a positional relationship relative to each other as shown in FIG. 10, the target object 101a can be still held by the hand 102 even if a holding position of the hand 102 is moved in the direction of the central axis 111 of the target object 101a by a distance X. This holding position and posture modification range will be referred to as a "first holding position and posture modification range," in order to distinguish it from a second holding position and posture modification range, which will be described below. The second holding position and posture modification range is defined by an angle θ around a line 114 perpendicular to a central axis 111 of the target object 101a and to a central axis 113 of the hand 102. Thus, the object 102 can be still held by the hand 102 even if the hand 102 is rotated around the line 114 within a certain range of angle θ.

Figure 11:
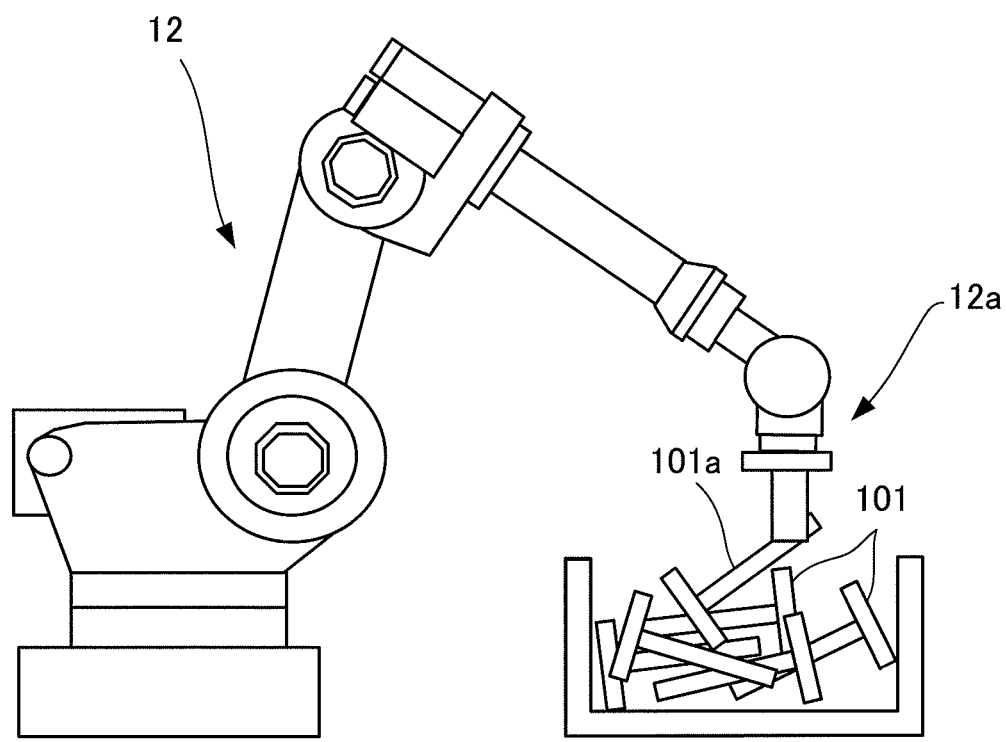
FIG. 11 illustrates a selection condition in the pickup device according to the fourth embodiment.

FIG. 11 illustrates a selection condition in the pickup device according to the fourth embodiment. In the fourth embodiment, a selection condition gives priority to the holding position and posture of the robot 12 shown in FIG. 11. Specifically, the selection condition gives priority to the state where the claws 106 are in a higher position, and the claws 106 are oriented vertically downward without being slanted relative to a vertical line when the target object 101a is held by the hand 102. If the claws 106 are in a lower position or slanted relative to the vertical line, there is a risk of contact between other objects 101 situated near the target object 101a and the hand 102 attached to the tip 12a or the arm of the robot 12, as described above in relation to the third embodiment. However, according to the fourth embodiment, priority is given as much as possible to the state where the claws 106 are in a higher position without being slanted. Therefore, the hand 102 can be avoided from unexpectedly coming in contact with other objects 101 near the target object 101a.

A holding position and posture of the robot 12 for holding a target object 101a can be determined within the holding position and posture modification range, according to the selection condition in the following way. A holding position and posture of the robot 12 which bring the claws 106 to a highest possible position within the holding position and posture modification range are determined, based on the first holding position and posture modification range and on a posture of the target object 101a. Depending on inclination of the object 101 along the central axis 111, which can be measured by the camera 11, it is determined as to which end of the distance X of the first holding position and posture modification range brings the claws 106 to a higher position when holding the target object 101a. In addition, the posture of the robot 12 resulting in the claws 106 being slanted to the minimum extent can be determined by obtaining a posture of the robot 12 in which a scalar product of a directional vector extending in the direction of the central axis 113 of the hand 102 and a directional vector extending perpendicular to the floor surface has the maximum value. The posture of the robot 12 for providing the scalar product of the maximum value can be obtained in the same way as the third embodiment.

Similarly to the second embodiment, in the case where a holding position and posture of the robot 12 are selected among a plurality of candidates for a holding position and posture, so as to ensure that there is no interference between the tool attached to the tip 12a or the arm of the robot 12 and an obstacle in the periphery of an operational area of the robot 12, a plurality of candidates for a holding position and posture distant from one another are generated for the first and second holding position and posture modification ranges, respectively, and a combination thereof can be used as candidates for a holding position and posture. For the respective candidates obtained in the above-described way, heights of the claws 106 when holding the target object 101a are calculated, and an angle defined between a directional vector extending in the direction of the central axis 113 of the hand 102 and a directional vector extending perpendicular to the floor surface is calculated. Based on the result of the calculation, priority of the candidates for a holding position and posture is further calculated, and then the candidates having higher priority are successively judged as to whether or not there is interference. The candidate for a holding position and posture which has been judged as not getting involved with interference is selected as a holding position and posture of the robot. The priority specified by the selection condition is obtained by summing a height of the claws 106 for holding the target object 101a multiplied with a weighing factor and an angle defined between the two directional vectors multiplied with a weighing factor. However, the calculation process of the priority is not limited to the above example, any other process which allows time required for movement of the robot 12 to be reduced and realizes a stable pickup process may also be employed. In addition, the calculating process of the priority may be carried out in a predetermined way, or may be in a selected way as necessary, depending on an operator.

The above embodiments are described only for the illustrative purpose, and therefore the present invention is not limited by a particular configuration and/or function according to the above embodiments and variants thereof. Constituent elements of the above embodiments and variants thereof can be replaced with alternatives which are obvious to a person skilled in the art, while substantially maintaining the identity of the present invention. Thus, the embodiments including such alternative constituent elements also fall within the technical scope and the spirit of the present invention. Further, any combination of one or more of the above embodiments and variants thereof is included in the present disclosure.

EFFECT OF THE INVENTION

With the pickup device according to the present invention, an optimal position and posture of the robot are selected among other possible holding positions and postures of the robot, in accordance with the priority specified by the selection condition. Thus, an increase in time required for a pickup process and any deviation from the movable range of the robot can be avoided. Movement of the robot which possibly results in being in contact with the obstacle may also be avoided as necessary. Since the calculation of the holding position and posture of the robot is performed for each object, it is always ensured that the cycle time can be reduced and the system can be stabilized.

Although the invention has been shown and described with exemplary embodiments thereof, it should be understood by a person skilled in the art that the foregoing and various other changes, omissions and additions may be made therein and thereto without departing from the spirit and scope of the invention.

What is claimed is:

1. A pickup device for picking up a target object from a plurality of objects, comprising:
  a robot equipped with a tool adapted to hold the target object;
  a sensor for measuring positions and postures of the plurality of objects;
  a reference holding position and posture storing unit for storing a reference holding position and posture which serve as a reference for a position and posture of the robot relative to the target object when the robot holds the target object by the tool;
  a holding position and posture modification range storing unit for storing a holding position and posture modification range which corresponds to a range of modification which can be applied to the reference holding position and posture so as to hold the target object by the tool;
  a holding position and posture calculating unit for calculating a holding position and posture of the robot in which the robot can hold the target object by the tool, based on the position and posture of the target object measured by the sensor and on the reference holding position and posture;
  a selection condition storing unit for storing at least one selection condition, based on which priority of the holding position and posture of the robot can be determined; and
  a holding position and posture selecting unit for selecting one of the holding positions and postures of the robot in accordance with the priority determined by the selection condition, the holding positions and postures of the robot being obtained from the holding position and posture calculated by the holding position and posture calculating unit and from the holding position and posture modification range.

2. A pickup device for picking up a target object from a plurality of objects, comprising:
  a robot equipped with a tool adapted to hold the target object;
  a sensor for measuring positions and postures of the plurality of objects;

a reference holding position and posture storing unit for storing a reference holding position and posture which serve as a reference for a position and posture of the robot relative to the target object when the robot holds the target object by the tool;

a holding position and posture modification range storing unit for storing a holding position and posture modification range which corresponds to a range of modification which can be applied to the reference holding position and posture so as to hold the target object by the tool;

a holding position and posture calculating unit for calculating a holding position and posture of the robot in which the robot can hold the target object by the tool, based on the position and posture of the target object measured by the sensor and on the reference holding position and posture;

a selection condition storing unit for storing at least one selection condition, based on which priority of the holding position and posture of the robot can be determined;

a shape data storing unit for storing a shape data of the tool and a shape data of an obstacle which exists in the periphery of the robot;

a judging unit for judging as to whether there is interference between the tool and the obstacle, based on the position and posture of the robot, on the shape data of the tool and on the shape data of the obstacle; and a holding position and posture selecting unit for selecting one of the holding positions and postures of the robot in accordance with the priority determined by the selection condition, the holding positions and postures of the robot being judged by the judging unit that there is no interference, the holding positions and postures of the robot being obtained from the holding position and posture calculated by the holding position and posture calculating unit and from the holding position and posture modification range.

3. The pickup device according to claim 1, wherein the selection condition is adapted to give priority to the holding position and posture of the robot in which a distance between a first point, line or plane and a second point, line or plane is greater or smaller, the first point, line or plane being situated at a position fixed to the tool of the robot, the second point, line or plane being situated at a fixed position independent of the robot.

4. The pickup device according to claim 1, wherein the selection condition is adapted to give priority to the holding position and posture of the robot in which an angle defined between a first line and a second line is greater or smaller, the first line being situated at a position fixed to the tool of the robot, the second line being situated at a fixed position independent of the robot.

5. The pickup device according to claim 1, wherein the selection condition is adapted to give priority to the holding position and posture of the robot in which the robot has a posture similar to a predetermined posture of the robot specified independently of the position and posture of the target object.

6. The pickup device according to claim 2, wherein the selection condition is adapted to give priority to the holding position and posture of the robot in which a distance between a first point, line or plane and a second point, line or plane is greater or smaller, the first point, line or plane being situated at a position fixed to the tool of the robot, the second point, line or plane being situated at a fixed position independent of the robot.

7. The pickup device according to claim 2, wherein the selection condition is adapted to give priority to the holding position and posture of the robot in which an angle defined between a first line and a second line is greater or smaller, the first line being situated at a position fixed to the tool of the robot, the second line being situated at a fixed position independent of the robot.

8. The pickup device according to claim 2, wherein the selection condition is adapted to give priority to the holding position and posture of the robot in which the robot has a posture similar to a predetermined posture of the robot specified independently of the position and posture of the target object.

* * * * *